US011882321B2

(12) United States Patent
Dunker et al.

(10) Patent No.: US 11,882,321 B2
(45) Date of Patent: *Jan. 23, 2024

(54) ESTABLISHMENT AND USE OF TIME MAPPING BASED ON INTERPOLATION USING LOW-RATE FINGERPRINTING, TO HELP FACILITATE FRAME-ACCURATE CONTENT REVISION

(71) Applicant: Roku, Inc., San Jose, CA (US)

(72) Inventors: Peter Dunker, Thuringia (DE); Markus K. Cremer, Orinda, CA (US); Shashank C. Merchant, Sunnyvale, CA (US); Kurt R. Thielen, Maple Grove, MN (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,183

(22) Filed: Mar. 2, 2022

(65) Prior Publication Data

US 2022/0191563 A1 Jun. 16, 2022

Related U.S. Application Data

(63) Continuation of application No. 17/302,720, filed on May 11, 2021, now Pat. No. 11,303,939, which is a
(Continued)

(51) Int. Cl.
*H04N 21/234* (2011.01)
*G06F 17/18* (2006.01)
*H04N 21/43* (2011.01)

(52) U.S. Cl.
CPC ....... *H04N 21/23424* (2013.01); *G06F 17/18* (2013.01); *H04N 21/4305* (2013.01)

(58) Field of Classification Search
CPC .......... H04N 21/23424; H04N 21/4305; G06F 17/18
See application file for complete search history.

(56) References Cited

U.S. PATENT DOCUMENTS 7,269,330 B1  9/2007 Iggulden
8,413,207 B2  4/2013 Fukuda
(Continued)

FOREIGN PATENT DOCUMENTS

JP  2017111274  6/2017
JP  2017-535214 A  11/2017
(Continued)

OTHER PUBLICATIONS

International Preliminary Report on Patentability from International Application No. PCT/US2019/035974, dated Jan. 19, 2021.
(Continued)

*Primary Examiner* — Randy A Flynn
(74) *Attorney, Agent, or Firm* — Sterne, Kessler, Goldstein & Fox P.L.L.C.

(57) ABSTRACT

A media client ascertains a plurality of matching points between (i) query fingerprints representing a media stream being received by the client and (ii) reference fingerprints, each identified matching point defining a respective match between a query fingerprint that is timestamped with client time defined according to a clock of the client and a reference fingerprint that is timestamped with true time defined according to a timeline within a known media stream. Further, the client performs linear regression based on the timestamps of the ascertained plurality of matching points, to establish a mapping between true time and client time. The client then uses the established mapping as a basis to determine a client-time point at which the client should perform an action with respect to media stream being
(Continued)

received by the client. And the client performs the action at the determined client-time point.

20 Claims, 5 Drawing Sheets

Related U.S. Application Data continuation of application No. 16/890,592, filed on Jun. 2, 2020, now Pat. No. 11,044,499, which is a continuation of application No. 16/166,981, filed on Oct. 22, 2018, now Pat. No. 10,715,840.

(60) Provisional application No. 62/700,660, filed on Jul. 19, 2018.

(56) References Cited

U.S. PATENT DOCUMENTS

| | | | |
|---|---|---|---|
| 8,611,422 B1* | 12/2013 | Yagnik | G06F 16/783 375/240.12 |
| 9,113,202 B1 | 8/2015 | Wiseman et al. | |
| 9,179,198 B2 | 11/2015 | Kitazato | |
| 9,456,237 B2 | 9/2016 | Oztaskent et al. | |
| 10,158,907 B1 | 12/2018 | Wang et al. | |
| 10,356,473 B2 | 7/2019 | Kitazato | |
| 10,497,378 B2 | 12/2019 | Wang et al. | |
| 10,694,264 B2 | 6/2020 | Van Deventer et al. | |
| 2004/0237102 A1 | 11/2004 | Konig et al. | |
| 2009/0158318 A1 | 6/2009 | Levy | |
| 2010/0005488 A1 | 1/2010 | Rakib et al. | |
| 2010/0269128 A1 | 10/2010 | Gordon | |
| 2011/0116719 A1 | 5/2011 | Bilobrov | |
| 2012/0078894 A1 | 3/2012 | Jiang et al. | |
| 2012/0095958 A1 | 4/2012 | Pereira et al. | |
| 2012/0117584 A1 | 5/2012 | Gordon | |
| 2013/0290502 A1 | 10/2013 | Bilobrov et al. | |
| 2013/0308818 A1 | 11/2013 | MacIntosh et al. | |
| 2014/0115627 A1 | 4/2014 | Lee et al. | |
| 2014/0193027 A1* | 7/2014 | Scherf | G06F 16/783 382/100 |
| 2016/0127759 A1 | 5/2016 | Jung et al. | |
| 2016/0316261 A1 | 10/2016 | Koshevoy | |
| 2016/0316262 A1 | 10/2016 | Chen | |
| 2017/0034549 A1 | 2/2017 | Gordon | |
| 2017/0094349 A1 | 3/2017 | Maughan | |
| 2018/0035149 A1 | 2/2018 | Choi et al. | |
| 2018/0139500 A1 | 5/2018 | Lee et al. | |
| 2018/0159914 A1 | 6/2018 | Zamaraiev et al. | |
| 2018/0192101 A1* | 7/2018 | Bilobrov | H04N 21/2541 |
| 2019/0018897 A1 | 1/2019 | Iannaccone | |
| 2020/0029108 A1 | 1/2020 | Dunker et al. | |

FOREIGN PATENT DOCUMENTS

| | | |
|---|---|---|
| KR | 20180014657 | 2/2018 |
| WO | WO-2016/043802 A1 | 3/2016 |
| WO | WO 2016/172711 | 10/2016 |
| WO | WO 2017/044258 | 3/2017 |
| WO | WO2017/151591 | 9/2017 |

OTHER PUBLICATIONS

International Preliminary Report on Patentability from International Application No. PCT/US2019/035973, dated Jan. 19, 2021.

Office Action from U.S. Appl. No. 16/166,971, dated Jan. 7, 2020.

Ondrej Pribula, et al., "Real-Time Video Sequences Matching Using the Spatio-Temporal Fingerprint," Melecon 2010-2010, 15th IEEE Mediterranean Electrotechnical Conference, Jun. 1, 2010.

Duan Deyou, et al., Robust Method for Video Fingerprint Extracting and Matching, Computer Engineering, Aug. 21, 2011.

EBU Operating Eurovision, Digital Video Broadcasting, Digital Video Broadcasting (DVB); Companion screens and Streams; Part 2: Content Identification and Media Synchronization, ETSI, Technical Specification, Draft TS 103 286-2 V1.2.1, Dec. 6, 2016, retrieved from the internet: https://www.dvb.org/resources/restricted/members/documents/TM-CSS/TM-CSS0130r27_Draft_TS_102_CSS_Companion-Screens-and-Streams.docx [retrieved on Dec. 6, 2016].

Extended European Search Report in related PCT Application No. PCT/US2019/035974, dated Apr. 4, 2022 (6 pages).

European Broadcasting Union (EBU) and Digital Video Broadcasting (DVB) Project, "Digital Video Broadcasting (DVB); Companion Screens and Streams; Part 2: Content Identification and Media Synchronization," European Telecommunications Standards Institute (ETSI) Draft Technical Specification TS 103 286-2 V1.2.1, 2015 (166 pages).

"Special features: Low price iMac review & next model prediction / Summer mobile utilization / Introduction to iOS application development starting with Photoshop / Thorough dissection of iTunes Match / App developer's idea generation technique," Editorial, MacPeople September issue (released on Jul. 29), printed from https://weekly.ascii.jp/elem/000/002/624/2624766/, 56 pages with translation, Jul. 29, 2014.

Search Report by Registered Search Organization, dated Jan. 31, 2022, for Japanese Patent Appl. No. 2021-502961, 97 pages with translation.

Guggenberger, M. et al., AudioAlign—Synchronization of A/V-Streams Based on Audio Data and Proceeding of 2012 IEEE International Symposium on Multimedia, Dec. 10, 2012, pp. 382-383.

* cited by examiner

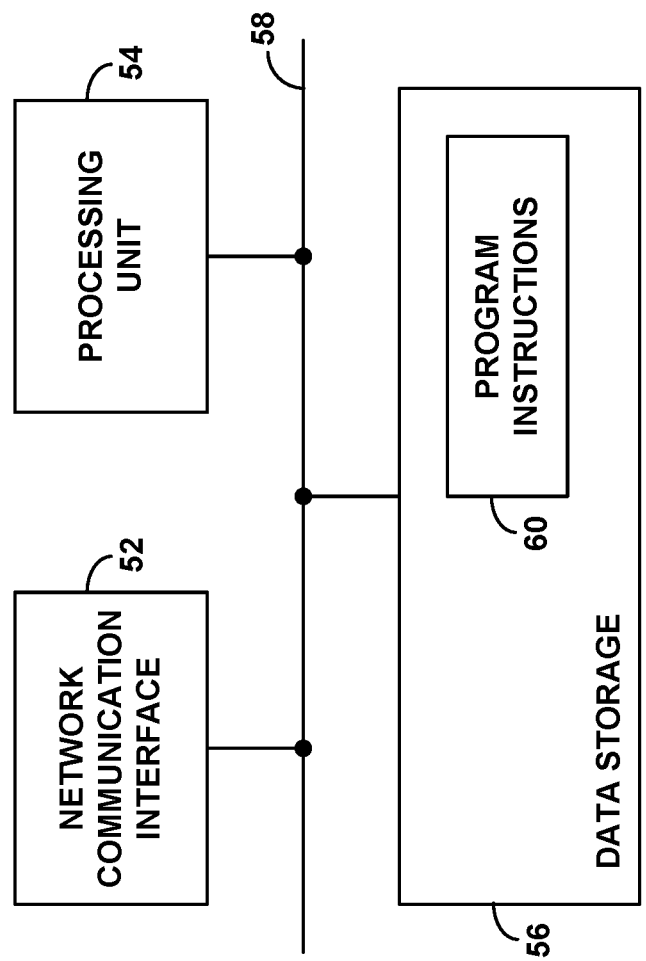

ESTABLISHMENT AND USE OF TIME MAPPING BASED ON INTERPOLATION USING LOW-RATE FINGERPRINTING, TO HELP FACILITATE FRAME-ACCURATE CONTENT REVISION

REFERENCE TO RELATED APPLICATION

This application is a continuation of U.S. patent application Ser. No. 17/302,720, filed May 11, 2021, which is a continuation of U.S. patent application Ser. No. 16/890,592, filed Jun. 2, 2020, which is continuation of U.S. patent application Ser. No. 16/166,981, filed Oct. 22, 2018, which claims priority to U.S. Provisional Patent Application No. 62/700,660, filed Jul. 19, 2018, the entirety of each of which is hereby incorporated by reference.

This application is also related to U.S. patent application Ser. No. 16/166,971, filed, Oct. 22, 2018, the entirety of which is hereby incorporated by reference.

BACKGROUND

A typical media client operates to receive an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, mobile communication devices, gaming consoles, streaming media players, and the like.

By way of example, the media client could be a television, which could receive a media stream (e.g., an over the air broadcast stream, a media stream output from a set top box, a media stream played from a digital storage medium, an Internet stream, or another such stream) and could present the media content of that stream to a user. As another example, the media client could be a set top box, which could receive a broadcast stream from a multi-channel video program distributor and could output the media content of that stream via a High-Definition Multimedia Interface (HDMI) cable or other interface to a television and/or audio/video receiver for playout. As still another example, the media client could be a digital video or audio recorder, which could likewise receive a broadcast stream but could store the stream for later playout. And as yet another example the media client could be a loudspeaker or headphones, which could receive an audio stream from a radio, computer, or other receiver or audio storage device and could present the audio content of that stream to a user. Numerous other examples are possible as well.

SUMMARY

When a media client is receiving a media stream, it may be useful in certain situations for the client to revise a portion of the stream's media content. For example, it may be useful for the client to dynamically replace an ad or other segment of the media content with a replacement ad or with other replacement content, so that when the content is played out to a user, the user would receive the replacement ad in place of the originally included ad. As another example, it may be useful for the client to dynamically supplement a portion of the media content with overlay or split-screen content, such as channel identification, context information, ad content, or the like, so that when the content is being played out to a user, the user would receive the supplemental content together with the originally included content.

Further, it may be desirable for the client to perform such content revision at a specific time point within the media stream. For instance, if the client is to dynamically replace an existing ad with a replacement ad, it may be desirable for the client to position the replacement ad at a time in the media stream when the existing ad would have started. Likewise, if the client is to supplement a specific portion of the media content with an overlay related to that portion, it may be desirable for the client to start the overlay when that portion starts. Other examples are possible as well.

More particularly, the media stream at issue could define a sequence of frames, such as video frames and/or audio frames, and it may be desirable for the client to perform the content revision on a frame-accurate basis. For instance, for ad replacement, it may be desirable for the client to insert the replacement ad in place of the existing ad starting precisely at the first frame of the existing ad. And for adding an overlay to a specific portion of the media stream, it may be desirable for the client to start the overlay at or in specific relation to the first frame of that portion of the media stream.

To facilitate having the client perform this content revision, the client may need to learn the specific time point where the revision is to occur. In practice, however, the revision time point may be defined on a timeline that is unknown to the client. For instance, the revision time point may be defined on a reference timeline within the media stream itself, but the client may not have context for that timeline. Therefore, providing the client with that revision time point may not enable the client to perform the revision at the desired time point in the media stream.

As an non-limiting example of this, consider a media stream that defines an ad pod that could appear within a television broadcast. An ad pod comprises a sequence of ads, such as television commercials. With this example, the client might be a television that is receiving and presenting a linear broadcast feed of a particular television channel, and the ad pod might appear at any moment within that feed. Especially with a live broadcast such as a sporting event, for instance, the time when the ad pod appears in such a feed may be unpredictable. Alternatively, the ad pod could appear at a specifically scheduled time.

In this example, the desired revision could be replacement of a particular ad within the ad pod (e.g. substituting for the ad a different ad or other replacement content). For instance, if the ad pod is a sequence of ads A1, A2, A3, A4, the desired revision could be replacement of ad A3.

In this situation, the ad pod may define an internal timeline, starting at time T=0 and continuing to the end of the ad pod, and ad A3 may begin at time $T_{A3}$ on that timeline. However, the client may lack context for that timeline. The client may have its own internal clock that has a timeline (e.g., time of day or other internal time reference) defining "client time." But without advanced knowledge of where the ad-pod timeline exists within client time, merely given the value $T_{A3}$ as the desired content-revision time point would not enable the client to perform the ad replacement when desired.

One way to address this issue is to perform fingerprint matching, comparing timestamped query fingerprints of the media stream being received by the client with timestamped reference fingerprints of the known media stream such as the known ad pod sequence.

For instance, the client could generate query fingerprints of frames of the media stream that the client is receiving and could timestamp those query fingerprints based on the client's internal clock, and a computing system could receive those timestamped query fingerprints for analysis. Further, the computing system could be provisioned with reference fingerprints of frames of the known media stream such as the known ad pod sequence, timestamped based on reference time or "true time" defined along a timeline within the known media stream.

The computing system could thus compare the timestamped query fingerprints with the timestamped reference fingerprints in an effort to find a matching point where a query fingerprint matches a reference fingerprint, and upon finding the matching point, could conclude that the timestamp of the matching query fingerprint corresponds with the timestamp of the matching reference fingerprint.

Establishing this correlation between the timestamps of the matching query and reference fingerprints could constitute establishing "synchronous lock" or time mapping between client time and true time. For instance, a difference between the timestamp of the matching query fingerprint and the matching reference fingerprint could define a time offset between true time within the known media stream and client time as the client receives the media stream. Given knowledge of a true-time point of a frame within the known media stream, the computing system could thus use the established synchronous lock to determine the associated client-time point of the same frame in the media stream being received by the client. For instance, the computing system could apply the time offset between true time and client time, in order to determine the client-time point corresponding with the given true-time point.

Continuing with the ad-pod example above, the computing system could use the established synchronous lock to map the true-time value $T_{A3}$ to a client-time value denoting the client-time point when the client should replace ad A3 in the media stream being received by the client (e.g. the client-time point where the client should start the ad replacement). And the client could then perform the replacement of ad A3 at that determined client-time point.

A technological problem that can occur with this process, however, is that the client may not generate query fingerprints fast enough to facilitate high-confidence fingerprint matching between the query fingerprints and the reference fingerprints. In particular, to help conserve limited processing power, memory, and/or other resources at the client, the client may be arranged to generate fingerprints at a relatively low frame rate, which may be far below the frame rate of the media stream that the client is receiving. As a result, the detected fingerprint matching may be inaccurate and the established synchronous lock may be inaccurate.

For example, with video having 30 frames per second, the client might be set to generate query fingerprints at a low frame rate such as 2 frame per second. But performing fingerprint matching at that low rate may result in a low-confidence fingerprint matching.

One reason for this difficulty is that the media stream may include various sub-sequences of identical or nearly identical frames, corresponding with portions of the media sequence where the media content does not change materially over a period of time. An example of this could be video that presents a still image for a period of time. In that scenario, a query fingerprint might match multiple consecutive reference fingerprints within a defined matching tolerance.

As a result, the computing system's detecting of a given matching point might be relatively low-confidence. And consequently, the computing system's established mapping between true-time and client-time would be potentially inaccurate, which could give rise to user-experience problems. For instance, inaccurate time mapping could result in the client performing a directed content revision too early or too late. With content replacement (e.g., ad replacement), a user could perceive this poorly timed content revision as a discontinuity or inconsistency in the presented media content.

Per the present disclosure, this issue can be at least partly resolved by taking into account multiple detected matching points and interpolating between those points to establish an improved mapping between true time and client time.

In a representative implementation, given low-rate query fingerprints generated by the client, the computing system could conduct fingerprint comparisons as discussed above, and the computing system could detect multiple matching points over time, with each matching point representing a determined correlation between a true-time point and a client-time point. As the computing system detects these matching points, the computing system could then programmatically establish a scatter plot of the points and perform linear regression to establish a best-fit line that represents an improved mapping between true time and client time.

The computing system could then use this improved mapping as a basis to predict what point in client time will correlate with an upcoming point in true time, so as to facilitate having the client perform a content revision or take other associated action (e.g., preparation for content revision) at the upcoming time point. For instance, the computing system could use the improved mapping as a basis to predict what point in client time will correlate with a true-time reference timestamp of an upcoming frame where the client is to perform a content revision. And the computing system could then cause the client to perform the content revision at that predicted client-time point.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 5 is a simplified block diagram depicting components of a computing system operable in accordance with the disclosure.

DETAILED DESCRIPTION

Figure 1:
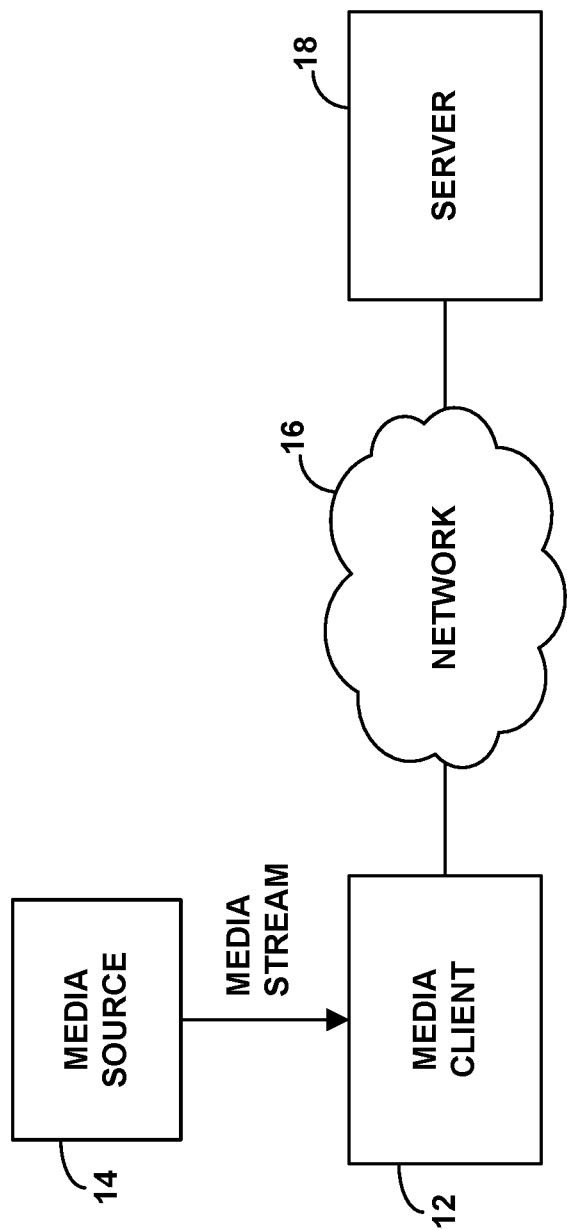
FIG. 1 is a simplified block diagram of system in which disclosed features can be implemented.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that operations described herein as being carried out by one or more entities could be implemented by and/or on behalf of those entities, through hardware, firmware, and/or software, such as by one or more processing units executing program instructions or the like.

As shown in FIG. 1, the example system includes a media client 12 configured to receive a media stream in real-time from a media source 14.

In practice, the media client 12 could be configured to operate as described above to receive from the media source 14 an analog or digital media stream representing media content such as video and/or audio content and to output the media content and/or forward the stream for presentation of the content on a user interface such as a display screen and/or an audio speaker. The media client could take any of the forms described above, among other possibilities.

The media source 14 could also take various forms, possibly depending on the form of the media client 12. By way of example, if the media client 12 is a television, the media source 14 could be a local set top box (e.g., cable or satellite receiver) or a streaming media server, configured to output a selected media stream for presentation by the television, or the media source 14 could be a broadcast television station or the like, among other possibilities. And if the media client is a computer, the media source may comprise an Internet streaming media server or other media provider. Alternatively, the media source 14 could be data storage integrated with and/or accessible locally by the media client 12, with the media client receiving (e.g., retrieving) the media stream from the data storage for playout. Other examples are possible as well.

As further shown in FIG. 1, media client 12 could be in communication over a network (e.g., the Internet or a private network) 16 with a network server 18, which may or may not be associated with and/or integrated with media source 14.

In an example implementation, media client 12 and network server 18 could engage in data communication to facilitate carrying out operations such as those noted above. For instance, aspects of a representative computing system could be implemented by the server 18, interoperating with the client 12 to establish synchronous lock, to apply the synchronous lock to determine a client-time point when the client should perform a content revision, and to cause the client to perform the content revision at the determined client-time point. Further or alternatively, aspects of a representative computing system could be implemented by the client 12, interoperating with the server 18 to carry out similar operations.

As noted above, when a media client such as client 12 is receiving a media stream, it may be useful for the client to revise a portion of the stream's content, such as to replace or supplement a segment of the stream's content. Further, as noted above, it may be desirable for the client to do so at a specific time point within the media stream. For instance, if the stream defines a sequence of frames, such as video frames and/or audio frames, it may be desirable for the client to perform the revision starting at a specific frame of the sequence.

To facilitate such content revision, a computing system could first identify the media stream that is being received by the client. For instance, the computing system could first determine that the media stream being received by the client is one that contains particular content that should be revised. Upon identifying the media stream, the computing system could then determine a specific point in the media stream where the client should perform the content revision and could cause the client to perform the content revision at that determined point.

One way to identify the media stream being received by a client is to have the client (or perhaps an adjunct device) generate digital fingerprint data representing the media content being received by the client, and to have server 18 compare that fingerprint data with reference fingerprint data representing media content of a known media stream, with a fingerprint match indicating that the client is receiving the known media stream.

In an example implementation, server 18 or another such entity could establish or otherwise have access to reference fingerprint data representing the known media stream. For instance, the server could establish or be provisioned with a sequence of reference digital fingerprints representing frames of the media stream. The server or another entity could establish these reference fingerprints by programmatically analyzing frames of the known media stream, receiving as input a copy of the known media stream and applying any media fingerprinting process or algorithm now known or later developed to generate the reference fingerprints. These reference fingerprints could be generated at a relatively high level of granularity to facilitate fingerprint matching. For example, for a media stream comprising video at 30 frames per second, the sequence could include a reference video fingerprint of every frame, thus likewise at a rate of 30 frames per second, or at another reasonably high rate.

Further, in real time as the client 12 receives a media stream, the client could generate query fingerprint data representing the media content of the stream that it is receiving and could transmit the query fingerprint data to the server 18 for analysis. The client could establish these query fingerprints using the same fingerprinting process or algorithm applied to establish the reference fingerprints, to facilitate fingerprint comparisons. However, as noted above, due to resource limitations at the client (e.g., limitations on processing power, memory, and network speed) or for other reasons, and given that this query-fingerprint generation could be an ongoing process for the client, the client could be configured to generate these query fingerprints at a relatively low rate. For instance, for a media stream comprising video, the client could be configured to generate these query fingerprints at a rate of only 2 frames per second, and the client might transmit generated query fingerprints to the server every 1.5 seconds or so. Other examples are possible as well.

As the server receives the query fingerprint data from the client, the server could compare the query fingerprint data with the reference fingerprint data of the known media stream. And if the server thereby determines with sufficient confidence that the query fingerprint data matches the reference fingerprint data, the server could conclude that the media stream being received by the client is the known media stream (i.e., a copy of the known media stream).

The server could conduct this fingerprint comparison on a per-frame basis. Considering video content, for instance, the server could conduct the analysis on a per-video-frame basis, comparing a query fingerprint of a frame against a reference fingerprint of a frame. The comparison process could take any of a variety of forms, depending on the structure of the fingerprints. For example, the comparison could involve computing a maximum deviation between the fingerprints and determining if the maximum deviation is within a predefined tolerance. Further, if the fingerprints are binary, this could be a Boolean determination or could involve computing a Hamming distance (as a count of mismatches between respective bit locations in the fingerprints). And if the fingerprints are more complex values, such as decimal values or vectors (e.g., grey values per video frame region), this could involve determining a distance between the values or vectors. Numerous other examples are possible as well.

In addition, the server could conduct the fingerprint comparison process with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media.

Further, the server could conduct the fingerprint comparison with respect to one query fingerprint at a time. For instance, the server could compare each sequentially provided query fingerprint with the reference fingerprints in an effort to find a reference fingerprint that matches the query fingerprint within a defined matching tolerance.

Alternatively, the server could conduct the comparison with respect to a bundle of fingerprints at a time. For instance, the server could compare each sequential bundle of four consecutive query fingerprints (on a sliding window basis, or as discrete, sequential groups) with the reference fingerprints in an effort to find a bundle of four reference fingerprints that match the group of four query fingerprints within a defined matching tolerance. To facilitate this, if the query fingerprints and reference fingerprints are generated at different frame rates than each other, the server could configure its search for a matching bundle of reference fingerprints that are spaced apart from each other in time the same as the bundle of query fingerprints are. For instance, if the query fingerprints are generated at 2 frame per second (i.e., 500 milliseconds apart from each other) and the reference fingerprints are generated at 30 frames per second, then server could search for a bundle of four reference fingerprints that are 500 milliseconds apart from each other and that match a group of four consecutive query fingerprints, within a defined matching tolerance.

When the server has detected matching content with sufficient confidence, the server will therefore have identified one or more matching points in the media stream. If the server performed the fingerprint comparison using one fingerprint at a time, then each matching point would be a frame that the matching reference fingerprint represents. Whereas, if the server performed the fingerprint comparison using a group of fingerprints at a time, then each matching point could be a frame that the first or another designated reference fingerprint in the matching group represents. In any event, this matching could establish or establish or support a conclusion that the media stream being received by the client is the known media stream.

Alternatively, the server could identify the media stream at issue in other ways. For instance, if the media stream contains watermark data corresponding with an identity of the media stream, the client could read or otherwise extract the watermark data and report the watermark data to the server. And the server could then use the reported watermark data as a basis to identify the media stream being received and/or played by the client.

Having identified the media stream being received by the client, the server could then determine a point in the media stream where the client should perform a content revision. In a representative implementation, for instance, the server could have access to reference data that indicates the point in the known media stream where a content revision is to occur and that indicates what content revision is to occur at that point. For example, the reference data may identify a particular frame of the known media stream where a content revision is to start. Thus, the server could refer to the reference data to determine that desired content-revision point.

The server could then transmit to the client a directive that causes the client to perform the content revision at the determined point in the media stream. For instance, the server could transmit to the client over network 16 a message that specifies the determined point in the media stream and that provides the client with replacement or overlay media or otherwise directs the client as to what content revision the client is to perform at that point in the media stream. And the client could be configured to receive and interpret the directive and to responsively perform the content revision at the indicated point in the media stream.

In this process, the server may know the particular time point where the client should perform the content revision in the media stream. For instance, the reference data accessible by the server could specify this time point as a particular time measured in a timeline within the known media stream, i.e., within "true time" as described above. As noted above, for example, this timeline might start with an origin time (e.g., T=0) at a start of the known media stream, and each frame of the known media stream might occur at a particular time point on that timeline. Thus, the server may determine from reference data the true-time point where the client should perform the content revision in the media stream.

However, the client's time reference may be different. As noted above, the client's time reference may be "client time" defined according to an internal clock in the client. Although client time and true time may optimally run at the same rate as each other, their origin points would likely differ. Therefore, mere knowledge of a true-time point in the known media stream would not itself provide context in client time. As a result, at issue as noted above is how the server could characterize in a client-understandable manner the time point in the media stream where the client is to start performing the content revision.

One way to address this issue as suggested above is to have the server use client-provided timestamps of matching query fingerprints as a way for the server to determine the client's time reference for the media stream, and then have the server use that client time-reference as a basis to characterize the time point in the media stream where the client is to start the content revision.

To facilitate this, as the client generates its query fingerprints, the client could timestamp each query fingerprint based on the client's internal clock. Thus, the query fingerprints that the client transmits to the sever for analysis could be timestamped query fingerprints. Further, the server could be provisioned with or otherwise have access to timestamped reference fingerprints of the known media stream frames. For instance, the server could be provisioned with reference data specifying for each frame of the known media stream (i) a reference fingerprint of the frame and (ii) an associated true-time timestamp within the known media stream.

As the server receives the timestamped query fingerprints from the client, the server could compare the query fingerprints with the reference fingerprints in an effort to detect matching points, i.e., instances where a query fingerprint matches a reference fingerprint. When the server has detected one or more such matching points, the server will know for each detected matching point both (i) the true-time timestamp of the matching point and (ii) the client-time timestamp of the matching point.

As such, the server will have effectively established a synchronous lock between true time and client time. Namely, the server will have effectively established a mapping between (i) true-time timestamps within the media stream and (ii) client time according to the client's internal clock, as the server will now know both where in the media stream the matching frame was and what the client's time was at that time point in the media stream. As discussed above, this synchronous lock may constitute a time offset, such that the server could apply the time offset to a given true-time point in the media stream to determine the corresponding client-time point in the media stream.

Having found this matching point in the media stream and having established the synchronous lock, the server could compute the client-time point when the client is to perform the content revision in the media stream, i.e., where the client is to start the content in the media stream. For example, given the reference-data indication of the true-time point when the content revision is to occur, the server could apply the offset defined by the synchronous lock, to determine the associated client-time point when the content revision is to occur. Or the server could compute a duration within the known media stream from the true-time point of the matching point to the time of the frame where the content revision is to start and the server could then add that computed duration on to the client-time point of the matching point, in order to determine the associated client-time point when the content revision is to start. Other examples could be possible as well.

The server could then transmit a specification of this determined client-time point to the client, with a directive for the client to perform the content revision starting at this client-time point. And if the client is not already provisioned with information about the content revision to perform starting at that time, the server could also transmit that content-revision information to the client. For instance, the server could retrieve from data storage and transmit to the client certain replacement content for the client to substitute in place of content in the media stream being received by the client. Or the server could transmit to the client a pointer to such replacement content, such as a network or local storage address from which the client could obtain the replacement content.

The client could thus receive from the server the directive to start the content revision at the indicated client-time point. And if the client is not already provisioned with data defining the revision to perform at that client-time point, the client could receive that data, such as from the server or from an address specified by the server. By reference to the client's internal clock, the client could then work to accurately start the content revision at the indicated client-time point. For instance, at the indicated client-time point, the client could begin substituting frames of replacement content for frames of the media stream being received by the client, or overlaying supplemental content on frames of the media stream being received by the client, among other possibilities.

As noted above, however, another issue in this process can arise if the client generates its query fingerprints at a relatively low rate, such as video fingerprints at 2 frames per second as discussed above. Providing the server with query fingerprints generated at such a low rate could make it difficult for the server to confidently identify a matching point in the media stream and/or could result in low-confidence synchronous lock.

One reason for this difficulty as noted above is that the media stream may include various sub-sequences of identical or nearly identical frames, corresponding with portions of the media sequence where the media content does not change at all over a period of time. In that scenario, a query fingerprint might match multiple consecutive reference fingerprints within the defined matching tolerance. Further, a bundle of query fingerprints might match multiple bundles of reference fingerprints within the defined matching tolerance (e.g., with some query fingerprints in the bundle matching corresponding reference fingerprints more or less, possibly due to fading or other variations). As a result, the server's detecting of a match and establishing of synchronous lock may be relatively low-confidence.

Per the present disclosure, as noted above, this issue can be at least partly resolved by taking into account multiple detected matching points and interpolating between those points to establish an improved mapping between true-time and client-time.

In a representative implementation, as the server receives low-rate query fingerprints from the client and conducts a fingerprint comparisons as discussed above, the server will detect multiple matching points over time (for each of various query fingerprints or for each of various bundles of query fingerprints), with each matching point representing a determined correlation between a true-time point and a client-time point. As the server detects these matching points, the server could then programmatically establish a scatter plot of the points in Cartesian coordinates, with true time along one axis and client time along the other axis, and the server could perform linear regression to establish a best-fit line based on the points.

Figure 2:
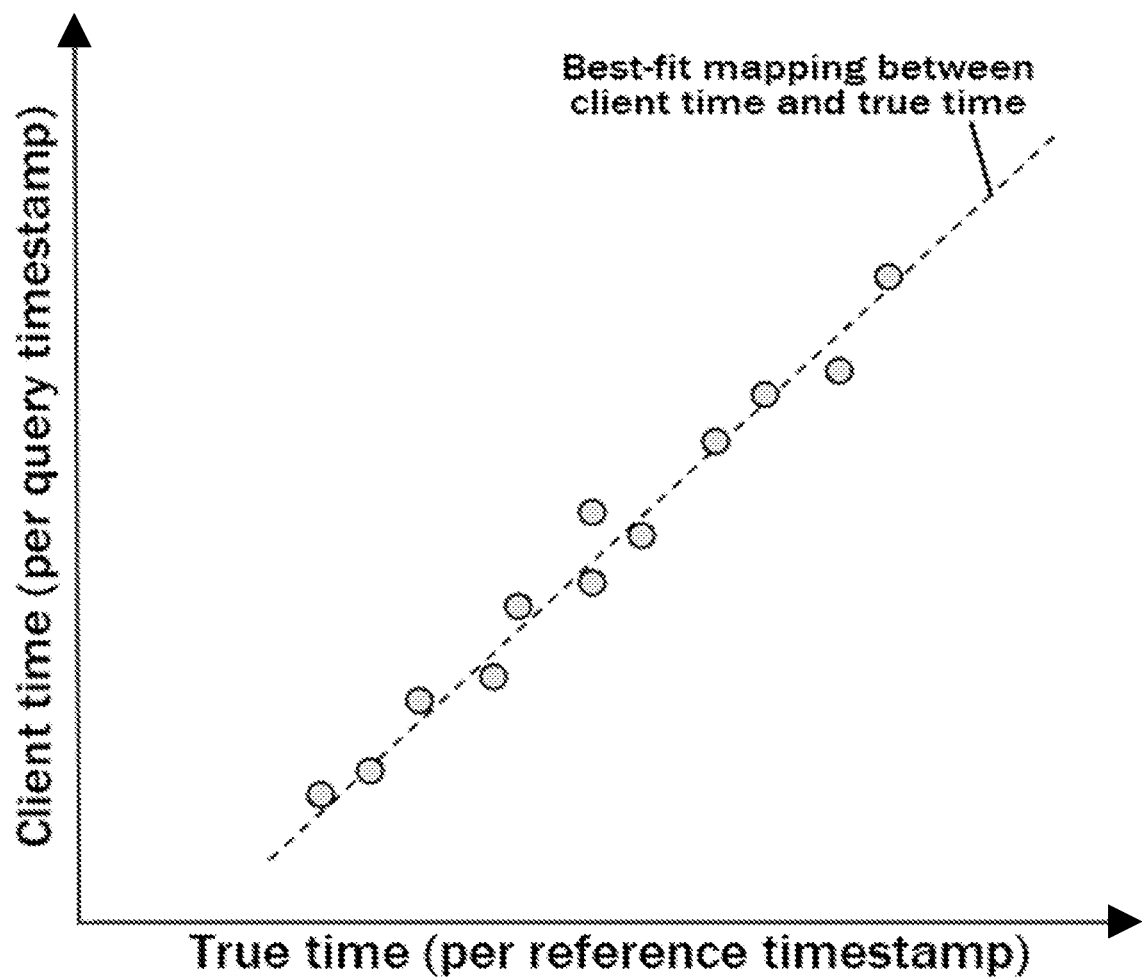
FIG. 2 is an example scatter plot of matching points each having a respective true-time value and a respective client-time value.

FIG. 2 illustrates this by way of example. In particular, FIG. 2 illustrates a scatter plot with true time along the x axis and client time along the y axis. The scatter plot includes multiple representative matching points, and the figure depicts a best-fit line established between the matching points. This best-fit line effectively represents an improved mapping, virtual timing, or synchronous lock between true time and client time. By performing linear regression over a sufficient quantity of matching points, the server could thus establish this improved mapping when faced with low-rate query fingerprints.

Note that the scatter-plot and best-fit analysis described here does not need to be done geometrically or visually. The server could carry out the process algorithmically, using any linear regression algorithm now known or later developed, based on the true-time, client-time coordinates of the detected matching points.

Note also that the best-fit line established in this process may typically have a slope of 1, assuming that the media stream rate (frames per second) at the client is the same as at the server. Given this, at issue could be where the best-fit line sits vertically or horizontally in the plot and thus what the time offset is between true-time and client-time. In addition, there could be scenarios where the media stream rate at the client differs somewhat from the media stream rate at the server, in which case the slope of the line may be different than 1.

The server could then use this improved mapping as a basis to predict what point in client-time will correlate with an upcoming point in true-time, such as with a reference timestamp of a frame where content revision or associated action is to occur. And the server could transmit to the client a directive that specifies the determined client-time and that directs the client to carry out the desired action when that client-time arrives.

As a non-limiting example of this process, consider a media stream that defines an ad pod that could appear within a television broadcast. As noted above, the ad pod would comprise a sequence of ads, such as television commercials, and the ad pod could appear at any given time in a linear media feed, such as a linear broadcast feed, being received by the client.

In practice, the server could be provisioned with time-stamped reference fingerprints representing and corresponding with the frames of the ad pod, with the timestamps being points along a timeline defined within the ad pod (as true-time). Further, the server could be provisioned with an indication that a particular one of the ads in the ad pod should be replaced, and with a timestamp of the frame where that ad replacement should start.

On an ongoing basis, or in response to one or more other triggers, as the client is receiving a media feed, the client could be generating low-rate timestamped query fingerprints of the broadcast feed, such as at 2 frames per second, and could be reporting those timestamped query fingerprints to the server for analysis. Comparing each such query fingerprint with the reference fingerprints representing the frames of the ad pod sequence, the server could thereby detect that the client is receiving the known ad pod sequence.

Having determined that the client is receiving the ad pod sequence, the server could then work to establish the improved mapping between true time and client time so as to then determine a client-time when the client is to start the ad replacement.

For instance, the server could compare bundles of the reported query fingerprints with bundles of correspondingly spaced reference fingerprints and could thereby find multiple matching points over time (possibly starting with one or more matching points that the server identified as a basis to detect in the first place that the client is receiving the ad pod sequence). As discussed above, each matching point would correlate a true-time point (timestamp of a representative matching reference fingerprint) with a client-time point (timestamp of a representative matching query fingerprint). Further, the server could perform linear regression between these matching points to find a best-fit line, effectively representing the improved mapping between true time and client time, in the form of an offset between true-time and client-time.

Having established the improved mapping between true time and client time, the server could then apply the mapping as a basis to determine what client-time point will correspond with the true-time point at which the ad replacement is to start. In particular, given knowledge of the true-time point (the reference time) of the frame where the ad replacement is to start, the server could apply the offset defined by the improved mapping, to translate that true-time point to a client-time point.

The server could then transmit to the client a directive to start the ad replacement at that determined client-time point and could transmit to client the replacement ad (or a pointer to the replacement ad) if the client is not already provisioned with that information. And the client could then accordingly perform the ad replacement at the indicated client-time point.

Note that the process described above could be varied or enhanced in numerous ways.

By way of example, to help account for the possibility that a segment of the media stream is static (not materially changing over time), the server could be configured to disregard any bundle of query fingerprints that match each other (i.e., within a defined matching-tolerance). In particular, as the server receives query fingerprints from the client and seeks to compare successive bundles of query fingerprints, the server could evaluate each such bundle of query fingerprints to determine if the query fingerprints of the bundle match each other. If the server determines that all of the query fingerprints of the bundle match each other, then the server could responsively exclude that bundle of query fingerprints from the matching-point analysis. For instance, the server could responsively forgo seeking to find a bundle of reference fingerprints that match that bundle of query fingerprints. Whereas, if the server determines that the query fingerprints of the bundle do not all match each other, then the server could proceed with the matching-point analysis as discussed above, in an effort to find a matching point that the server could include in its scatter-plot and best-fit analysis.

In this example, at issue could be whether all of the query fingerprints in the bundle match each other. Such a match of low-rate query fingerprints could arise with respect to a sufficiently long static segment of the media stream. It may thus be useful to exclude that bundle of query fingerprints from the matching-point analysis, to help avoid factoring in a very low-confidence matching point.

On the other hand, consider a scenario where the bundle of four low-rate query fingerprints straddles a change from one static segment to another, different static segment. For instance, with video content, the first two query fingerprints of the bundle might represent frames before a scene change occurs, and the last two query fingerprints of the bundle might represent frames after the scene change occurs. In that situation, the four query fingerprints of the bundle would not all match each other, and so the server would include the bundle in its matching-point analysis and may then detect a matching point to include in its scatter-plot and best-fit analysis. With this example, though, it would be uncertain whether the matching point will fall right on the best-fit line or not, as it would be unclear where in time the scene change occurred between the frames represented by the second and third query fingerprints. But again, with a sufficient quantity of matching points, the best-fit analysis should still produce a useful, improved mapping as described above.

Thus, as another example, the server could require that there be at least a threshold minimum quantity of matching points within the media stream at issue, as a condition for the server proceeding with the interpolation. For instance, the server could keep a count of how many matching points it has found in the media stream at issue (e.g., in an ad pod). Once the server determines that the number of matching points in the media stream meets a predefined threshold, the server could responsively perform the scatter-plot and best-fit analysis described above in order to establish the improved time mapping based on the identified matching points and could then use that time mapping as described above. In practice, the threshold minimum quantity of matching points could be three matching points or could be another number of matching points deemed by engineering design to be sufficient for this purpose.

As still another example, after the server starts its scatter-plot and best-fit analysis, the server could continue to find matching points and refine its best-fit time mapping until the server reaches a stopping point when the server would deem the best-fit mapping to be usable. The stopping point could take various forms. For instance, the stopping point could be when the server has factored in a predefined threshold quantity of matching points, such as the threshold minimum quantity discussed above. Alternatively or additionally, the stopping point could be when the server has detected stability in the analysis, such as by detecting that the best-fit line (or the associated time offset between true-time and client-time) does not change more than a minimal threshold amount (e.g., predefined by engineering design) for each additional matching point factored into the analysis. Once the server detects the stopping point, the server could then stop collecting matching points and could proceed to use the latest best-fit analysis to map the true-time point where action (e.g., content revision) is to occur to an associated client-time point. And the server could accordingly direct the client to perform the action at the determined client-time point.

As yet another example, in addition to using the above process to determine the client-time point when a content revision or the like is to occur, the server could also use the process to determine an advanced client-time point when it would be useful for the client to start preparation for the content revision. For instance, if the client may need to start obtaining replacement or overlay content, through streaming or download from an Internet URL or other network address or source, and if it may take some time for the client to actually obtain or start receiving that replacement or overlay content, the server could compute an advanced client-time point that is sufficiently ahead of the content revision start time, to leave enough time for the client to obtain or start receiving the replacement or overlay content. The server could then transmit to the client a directive that specifies the advanced client-time point and that causes the client to start at that client-time point the process of obtaining the replacement or overlay content, and the client could proceed accordingly. The client could thus obtain or start receiving the replacement or overlay content by the time the client will need to perform the content revision.

Still further, as yet another example, although the above description provides for the server carrying out various operations, some or all of the operations could alternatively be carried out by the client or by another device. For instance, although the above discussion described the server working to establish improved mapping between true time and client time, and the server working to determine the client-time point when a content revision or other action is to occur, the client could be configured to carry out some of those operations itself.

In a representative variation, for example, once the server has determined that the client is receiving the known media stream and has found multiple matching points that correlate true time with client time, or as the server finds those matching points, the server could report the matching points to the client, advising the client of the true-time and client-time coordinates of each matching point. And the client could then use that provided data to perform the scatter-plot and best-fit analysis discussed above, so as to establish the improved mapping between true time and client time. Further, the server could provide the client with a directive that specifies the true-time point at which the client is to engage in a particular action (e.g., content revision or preparation for content revision), and the client could apply the established mapping as discussed above to translate that true-time point to a client-time point. The client could then work to carry out the indicated action at the determined client-time point.

Further, the client itself could carry out the fingerprint matching process as well. For instance, once the server has determined that the client is receiving the known media stream, the server could provide the client with a set of timestamped reference fingerprints for an upcoming portion of the media stream and could inform the client of the reference timestamp for the frame within the media stream where the desired action is to occur.

For instance, once the server has determined that the client is receiving the known media stream, the client could carry out the process to establish synchronous lock between (i) true-time timestamps in the media stream and (ii) time according to the client's internal clock, and to determine the client-time point when the content revision is to occur. To facilitate this in an example implementation, in addition to directing the client to switch to high-rate fingerprinting, the server could provide the client with a set of true-time timestamped reference fingerprints for an upcoming portion of the media stream and could inform the client of the true-time timestamp for the frame within the media stream where the content revision is to start.

The client could thus receive those timestamped reference fingerprints from the server. And the client could compare its low-rate query fingerprints with the provided reference fingerprints in an effort to find matching points. As or after the client finds multiple matching points, the client could then likewise perform the scatter-plot and best-fit analysis discussed above, to establish the improved mapping between true time and client time. Further, the client could apply that established mapping in the manner discussed above to determine a client-time point where an indicated content revision or other action is to occur. And the client could then perform the indicated action at the determined client-time point.

Note also that the above processes could apply with respect to real-time analysis of a linear broadcast feed or the like being received by a client (e.g., for present playout and/or storage) and could apply as well with respect to analysis of a media stream being retrieved by the client from data storage or the like (e.g., for present playout or transfer). Other implementations are possible as well.

Figure 3:
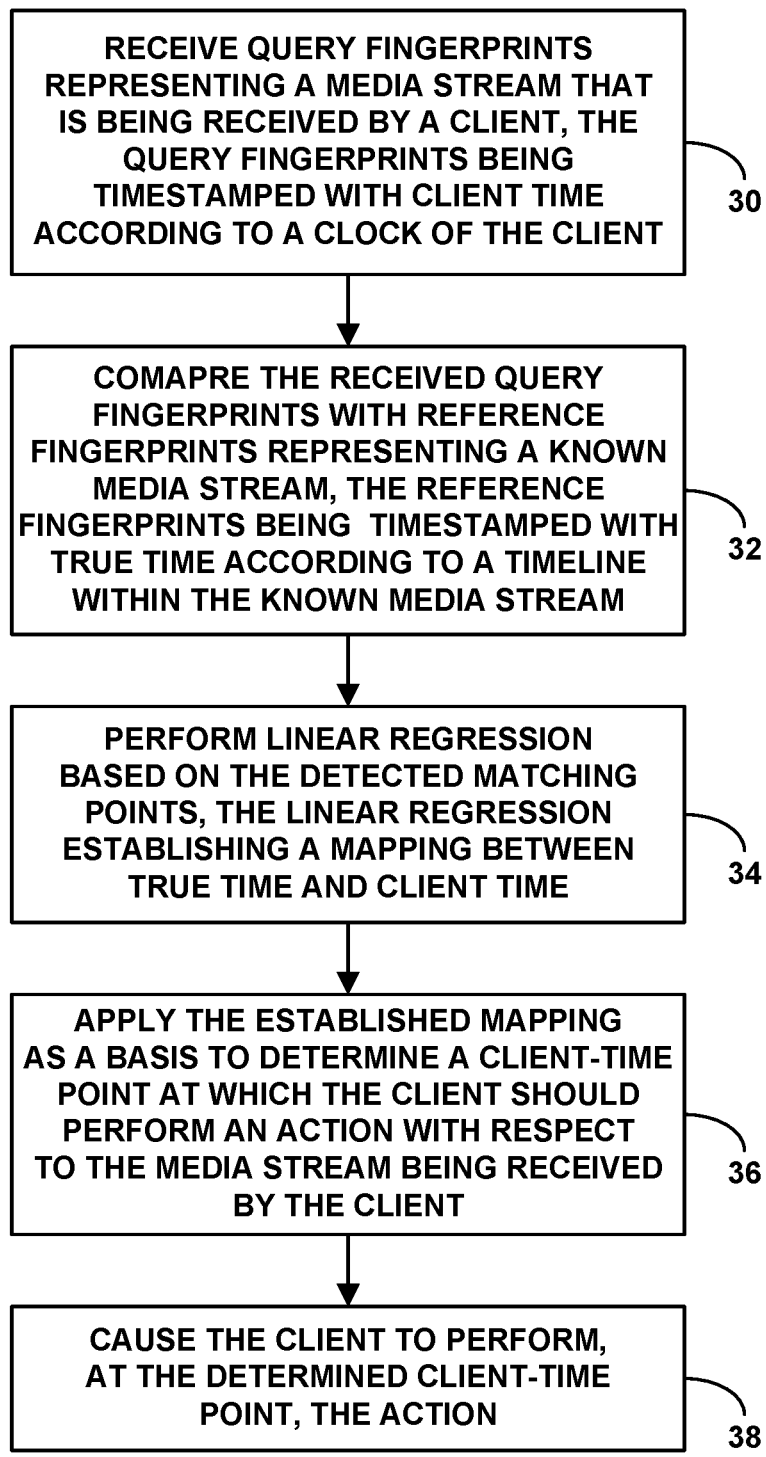
FIG. 3 is a flow chart depicting operations that could be carried out in accordance with the disclosure.

FIG. 3 is a flow chart depicting a method that could be carried out by a computing system in line with the discussion above. Although operations of the method are depicted in this figure as being carried out in a particular sequence, some of the operations could be carried out in parallel with others, and other modifications are possible as well.

As shown in FIG. 3, at block 30, the computing system receives query fingerprints representing a media stream that is being received by a client, the query fingerprints being timestamped with client time according to a clock of the client. Further at block 32, likely in parallel with block 30, the computing system compares the received query fingerprints with reference fingerprints representing a known media stream, the reference fingerprints being timestamped with true time according to a timeline within the known media stream. And at block 34, the computing system performs linear regression based on the detected matching points, the linear regression establishing a mapping between true time and client time.

At block 36, the computing system then applies the established mapping as a basis to determine a client-time point at which the client should perform an action with respect to the media stream being received by the client. And at block 38, the computing system causes the client to perform, at the determined client-time point, the action.

In line with the discussion above, the action that the computing system causes the client to perform at the determined client-time point could comprises a content revision.

For instance, the media stream being received by the client could comprise an ad pod defining a sequence of ads, and the content revision could comprise replacing an ad of the sequence with replacement media content. Alternatively, the action could comprise preparation for such a content revision, such as initiating a process to acquire new content to facilitate the content revision. Other actions are possible as well.

Further, as discussed above, the act of applying the established mapping as a basis to determine a client-time point at which the client should perform an action with respect to the media stream being received by the client could comprise using the established mapping as a basis to map a predefined true-time point at which the action should be performed with respect to the known media stream to a corresponding client-time point at which the client should perform the action with respect to the media stream being received by the client. For instance, given the true-time point of a frame in the known media stream where a content revision should occur, applying the established mapping could involve translating that true-time point to a corresponding client-time point at which the client should perform the content revision in the media stream being received by the client.

In addition, as discussed above, such a computing system could be implemented by a server that is in network communication with the client. In that case, the act of causing the client to perform the action at the determined client-time point could involve transmitting from the server to the client a directive to which the client will respond by performing the action at the determined client-time point.

Still further, as discussed above, each matching point in this process could be based on a comparison between (i) a respective bundle of the query fingerprints and (ii) the reference fingerprints. And in that case, the method could additionally include omitting an internally-matching bundle from the process. For instance, the method could involve detecting that the query fingerprints of a given bundle of the query fingerprints match each other and, responsive to the detecting that the query fingerprints of the given bundle match each other, excluding the given bundle from use to establish a matching point for the linear regression.

Yet further, in line with the discussion above, the method could include the computing system using one or more of the detected matching points as a basis to determine that the media stream being received by the client is the known media stream. For instance, the computing system could make this determination initially and then, in response to at least making this determination, the computing system could perform the linear regression, apply the mapping, and cause the client to carry out the action at the determined client-time point. Phrased another way, in that situation, the performing of linear regression, the applying of the mapping, and the causing of the client to perform the action at the determined client-time point could be collectively responsive to at least the determining that the media stream being received by the client is the known media stream.

Figure 4:
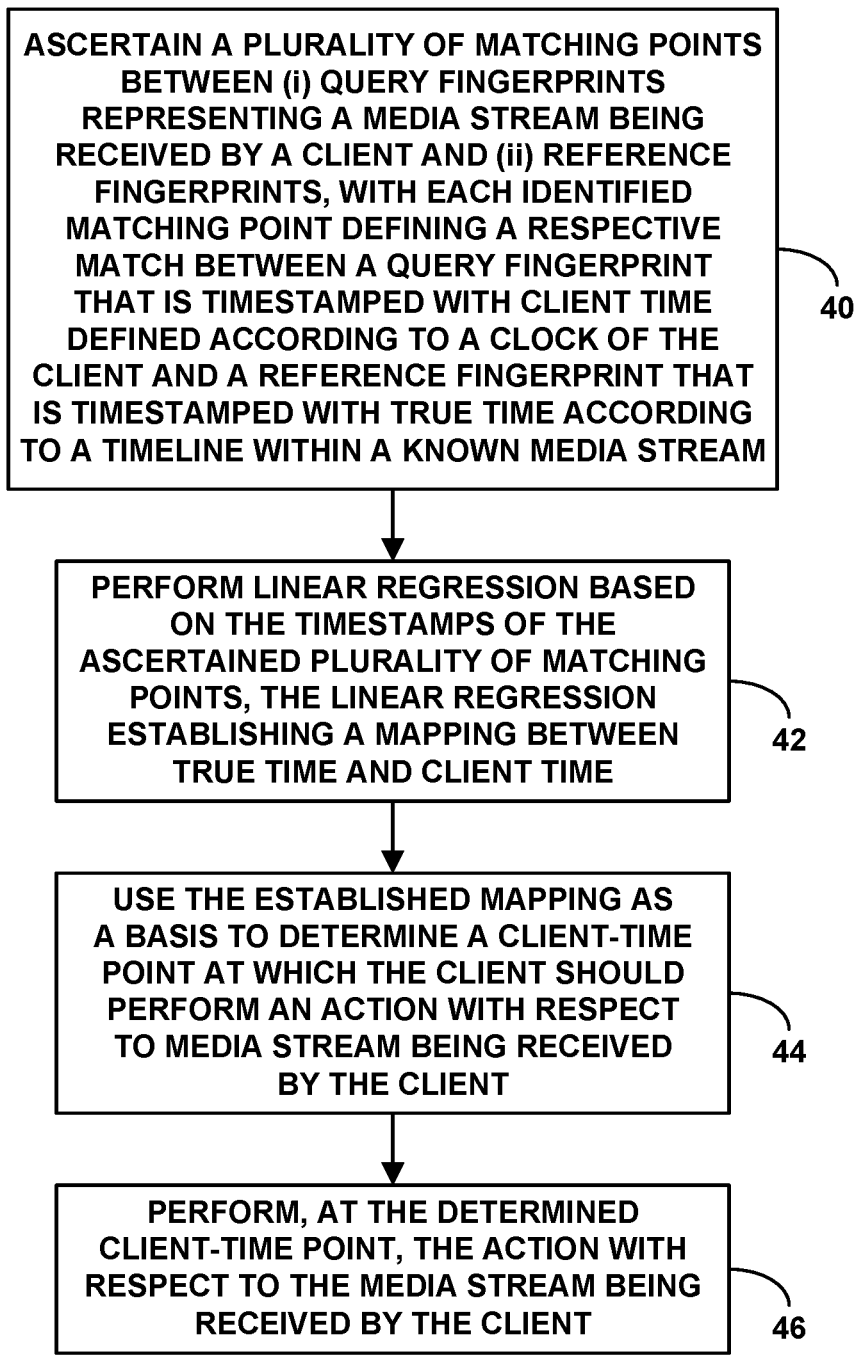
FIG. 4 is another flow chart depicting operations that could be carried out in accordance with the disclosure.

FIG. 4 is another flow chart depicting a method that could be carried out in accordance with the present disclosure, by the client or one or more other entities. Here again, although operations of the method are depicted as being carried out in a particular sequence, some of the operations could be carried out in parallel with others, and other modifications are possible as well.

As shown in FIG. 4, at block 40, the method includes ascertaining a plurality of matching points between (i) query fingerprints representing a media stream being received by a client and (ii) reference fingerprints, with each identified matching point defining a respective match between (i) a query fingerprint that is timestamped with client time defined according to a clock of the client and (ii) a reference fingerprint that is timestamped with true time according to a timeline within a known media stream.

Further, at block 42, the method includes performing linear regression based on the timestamps of the ascertained plurality of matching points, the linear regression establishing a mapping between true time and client time. At block 44, the method then includes using the established mapping as a basis to determine a client-time point at which the client should perform an action with respect to media stream being received by the client. And at block 46, the method include performing, at the determined client-time point, the action with respect to the media stream being received by the client.

In line with the discussion above, the act of ascertaining the plurality of matching points could take various forms. For instance, it could include the client receiving a set of data indicating the plurality of matching points. In an example implementation as discussed above, a server could perform fingerprint comparisons to determine the matching points and could send to the client information about the matching points, including client-time timestamp and true-time timestamp of each matching point, to enable the client to perform the linear regression.

Alternatively, as discussed above, the act of ascertaining the plurality of matching points could involve the client receiving the true-time timestamped reference fingerprints, the client generating the client-time timestamped query fingerprints, and the client comparing the generated query fingerprints with the received reference fingerprints in order to ascertain the matching points based on the comparing. Further, as discussed above, each matching point could be based on a comparison between (i) a respective bundle of the query fingerprints and (ii) the reference fingerprints. And in that case, the method could additionally involve detecting that the query fingerprints of a given bundle match each other and, responsive to detecting that the query fingerprints of the given bundle match each other, excluding the given bundle from use to establish a matching point for the linear regression.

In addition, as discussed above, the action with respect to the media stream being received by the client could take various forms. For instance, the action could comprise a content revision, such as ad replacement in an ad pod or the like. Or the action could comprise preparation for such a content revision, such as initiating content acquisition to facilitate the content revision. Other examples are possible as well.

Further, in line with the discussion above, the act of using the established mapping as a basis to determine a client-time point at which the client should perform the action with respect to the media stream being received by the client could involve using the established mapping as a basis to map a predefined true-time point at which the action should be performed with respect to the known media stream to a corresponding client-time point at which the client should perform the action with respect to the media stream being received by the client.

FIG. 5 is next a block diagram of an example computing system operable to carry out various operations described above. As noted above, aspects of such a computing system could be implemented by media client 12 and/or server 18, among other possibilities. Therefore, the block diagram of FIG. 4 could represent components of one or more such entities.

As shown in FIG. 5, the example computing system includes a network communication interface 52, a processing unit 54, and non-transitory data storage 56, all of which could be coupled or communicatively linked together through a network, message bus, and/or one or more other connection mechanisms 58.

Network communication interface 52 enables the computing system to transmit and receive. The network communication interface 52 could comprise wired and/or wireless Ethernet interface along with associated circuitry and software, among other possibilities. The processing unit 54 could then comprise one or more general purpose processors (e.g., microprocessors) and/or one or more specialized processors (e.g., application-specific integrated circuits or the like). And the non-transitory data storage 46 could comprise one or more volatile and/or non-volatile storage components, such as magnetic, optical, or flash storage.

As further shown in FIG. 5, the non-transitory data storage 56 stores (e.g., holds, is encoded with, or otherwise embodies or contains) program instructions 60 that are executable by the processing unit to cause the computing system to carry out operations such as those described above.

By way of example, these operations could include identifying a plurality of matching points between (i) query fingerprints representing a media stream being received by a media client and (ii) reference fingerprints, wherein each identified matching point defines a respective match between (i) a query fingerprint that is timestamped with client time defined according to a clock of the media client and (ii) a reference fingerprint that is timestamped with true time defined according to a timeline within a known media stream. Further, the operations could include performing linear regression based on the timestamps of the identified plurality of matching points, the linear regression establishing a mapping between true time and client time. The operations could then include using the established mapping as a basis to determine a client-time point at which the media client should perform a content revision in the media stream being received by the media client. And the operations could include causing the media client to perform, at the determined client-time point, the content revision.

Further, various features described above can be incorporated in this context, and vice versa. For instance, using the mapping could involve mapping a predefined true-time point of the content revision to a corresponding client-time point. And the content revision could involve content replacement, such as replacing an ad in an ad pod, or could involve overlaying content, among other possibilities.

In addition, if the computing system is disposed at and/or implemented by a server, the act of causing the media client to perform the content revision at the determined client-time point could involve outputting for transmission to the media client, and/or sending to the media client, a directive that causes the media client to do so. Further, the operations could include excluding from the analysis a bundle of query fingerprints that match each other. And the operations could additionally include using one or more of the identified matching points as a basis to determine that the media stream being received by the client is the known media stream, in which case the other operation could be collectively carried out in response that determination.

Alternatively or additionally, the operations could include ascertaining a plurality of matching points between (i) query fingerprints representing a media stream being received by a client and (ii) reference fingerprints, wherein each identified matching point defines a respective match between (i) a query fingerprint that is timestamped with client time defined according to a clock of the client and (ii) a reference fingerprint that is timestamped with true time defined according to a timeline within a known media stream. Further, the operations could include performing linear regression based on the timestamps of the ascertained plurality of matching points, the linear regression establishing a mapping between true time and client time. The operations could then include using the established mapping as a basis to determine a client-time point at which the client should perform an action with respect to media stream being received by the client. And the operations could include performing, at the determined client-time point, the action with respect to the media stream being received by the client.

Here too, various features described above can be incorporated in this context, and vice versa. For instance, if the computing system is disposed at and/or implemented by the client, the act of ascertaining the matching points could involve receiving data indicating some or all of the matching points and/or could involve (i) generating the query fingerprints, (ii) receiving the reference fingerprints, and (iii) comparing the query fingerprints with the reference fingerprints to ascertain the matching points. Further, the action with respect to the media stream being received by the client could comprise a content revision such as an ad replacement or could involve preparation for a content revision.

In addition, various operations described above could be defined by program instructions stored on a non-transitory computer readable medium, the program instructions being executable by a processing unit to carry out the operations (e.g., to cause the operations to be carried out). Such a non-transitory computer readable medium could then be provided, integrated, or otherwise implemented at the client, server, and/or another entity. Further, such operations could take other forms.

Exemplary embodiments have been described above. Those skilled in the art will understand, however, that changes and modifications may be made to these embodiments without departing from the true scope and spirit of the invention.

What is claimed is:
1. A method comprising:
  ascertaining a plurality of matching points between (i) query fingerprints representing a media stream being received by a client and (ii) reference fingerprints, wherein the reference fingerprints are generated at a first frame rate and the query fingerprints are generated at a second frame rate lower than the first frame rate, and wherein each identified matching point defines a respective match between (i) a query fingerprint that is timestamped with client time defined according to a clock of the client and (ii) a reference fingerprint that is timestamped with true time according to a timeline within a known media stream,
  wherein a first matching point of the plurality of matching points is based on analysis of a first bundle of query fingerprints at the second frame rate, wherein the first bundle comprises a match between some but not all query fingerprints of the first bundle at the second frame rate;
  performing linear regression based on the timestamps of the ascertained plurality of matching points, the linear regression establishing a mapping of an offset between the true time and the client time; and wherein the offset does not change more than a minimum threshold amount for an additional matching point factored into the linear regression, using the established mapping as a basis to determine a client-time point at which the client should perform an action with respect to the media stream being received by the client.

2. The method of claim 1, wherein a second matching point of the plurality of matching points is based on analysis of a second bundle of query fingerprints at the second rate, the method further comprising excluding the second bundle from use to establish the second matching point, the excluding being based on a determination that the query fingerprints of the second bundle match each other.

3. The method of claim 1, wherein the ascertaining of the plurality of matching points comprises receiving, by the client, a set of data indicating the plurality of matching points.

4. The method of claim 3, wherein the ascertaining the plurality of matching points comprises:
generating, by the client, the query fingerprints;
receiving, by the client, the reference fingerprints; and
comparing, by the client, the generated query fingerprints with the received reference fingerprints, and ascertaining the plurality of matching points based on the comparing.

5. The method of claim 1, wherein the action with respect to the media stream being received by the client comprises a content revision.

6. The method of claim 5, wherein the content revision comprises replacing playout of an ad in the media stream with playout of a replacement ad.

7. The method of claim 1, wherein the action with respect to the media stream being received by the client comprises preparation for a content revision.

8. The method of claim 1, wherein using the established mapping as a basis to determine a client-time point at which the client should perform the action with respect to the media stream being received by the client comprises using the established mapping as a basis to map a predefined true-time point at which the action should be performed with respect to the known media stream to a corresponding client-time point at which the client should perform the action with respect to the media stream being received by the client.

9. A media client comprising:
non-transitory data storage; and
a processor coupled to the non-transitory data storage, configured to:
ascertain a plurality of matching points between (i) query fingerprints representing a media stream being received by the media client and (ii) reference fingerprints, wherein the reference fingerprints are generated at a first frame rate and the query fingerprints are generated at a second frame rate lower than the first frame rate, and wherein each identified matching point defines a respective match between (i) a query fingerprint that is timestamped with client time defined according to a clock of the media client and (ii) a reference fingerprint that is timestamped with true time according to a timeline within a known media stream,
wherein a first matching point of the plurality of matching points is based on analysis of a first bundle of query fingerprints at the second frame rate, wherein the first bundle comprises a match between some but not all query fingerprints of the first bundle at the second frame rate;
perform linear regression based on the timestamps of the ascertained plurality of matching points, the linear regression establishing a mapping of an offset between the true time and the client time, and
wherein the offset does not change more than a minimum threshold amount for an additional matching point factored into the linear regression, use the established mapping as a basis to determine a client-time point at which the media client should perform an action with respect to the media stream being received by the media client.

10. The media client of claim 9, wherein a second matching point of the plurality of matching points is based on analysis of a second bundle of query fingerprints at the second rate, and the processor is further configured to exclude the second bundle from use to establish the second matching point, the excluding being based on a determination that the query fingerprints of the second bundle match each other.

11. The media client of claim 9, wherein to ascertain the plurality of matching points, the processor is further configured to receive a set of data indicating the plurality of matching points.

12. The media client of claim 9, wherein to ascertain the plurality of matching points, the processor is further configured to:
generate the query fingerprints;
receive the reference fingerprints;
compare the generated query fingerprints with the received reference fingerprints; and
ascertain the plurality of matching points based on the comparison.

13. The media client of claim 9, wherein the action with respect to the media stream being received by the media client comprises a content revision.

14. The media client of claim 13, wherein the content revision comprises replacing playout of an ad in the media stream with playout of a replacement ad.

15. The media client of claim 9, wherein the action with respect to the media stream being received by the media client comprises preparation for a content revision.

16. The media client of claim 9, wherein to use the established mapping as a basis to determine a client-time point at which the media client should perform the action with respect to the media stream being received by the media client, the processor is configured to: use the established mapping as a basis to map a predefined true-time point at which the action should be performed with respect to the known media stream to a corresponding client-time point at which the media client should perform the action with respect to the media stream being received by the media client.

17. A non-transitory computer-readable medium storing instructions that, when executed by a processor of a media client device, cause the media client device to perform operations, the operations comprising:
ascertaining a plurality of matching points between (i) query fingerprints representing a media stream being received by the media client device and (ii) reference fingerprints, wherein the reference fingerprints are generated at a first frame rate and the query fingerprints are generated at a second frame rate lower than the first frame rate, and wherein each identified matching point defines a respective match between (i) a query fingerprint that is timestamped with client time defined according to a clock of the media client device and (ii) a reference fingerprint that is timestamped with true time according to a timeline within a known media stream, wherein a first matching point of the plurality of matching points is based on analysis of a first bundle of query fingerprints at the second frame rate, wherein the first bundle comprises a match between some but not all query fingerprints of the first bundle at the second frame rate;

performing linear regression based on the timestamps of the ascertained plurality of matching points, the linear regression establishing a mapping of an offset between the true time and the client time; and wherein the offset does not change more than a minimum threshold amount for an additional matching point factored into the linear regression, using the established mapping as a basis to determine a client-time point at which the media client device should perform an action with respect to the media stream being received by the media client device.

18. The non-transitory computer-readable medium of claim 17, wherein a second matching point of the plurality of matching points is based on analysis of a second bundle of query fingerprints at the second rate, the operations further comprising excluding the second bundle from use to establish the second matching point, the excluding being based on a determination that the query fingerprints of the second bundle match each other.

19. The non-transitory computer-readable medium of claim 17, wherein the ascertaining the plurality of matching points operation comprises receiving a set of data indicating the plurality of matching points.

20. The non-transitory computer-readable medium of claim 19, wherein the ascertaining the plurality of matching points comprises:

generating the query fingerprints;

receiving the reference fingerprints;

comparing the generated query fingerprints with the received reference fingerprints; and ascertaining the plurality of matching points based on the comparison.

\* \* \* \* \*